(12) United States Patent
Ikejiri et al.

(10) Patent No.: US 11,404,726 B2
(45) Date of Patent: Aug. 2, 2022

(54) ALL-SOLID-STATE SODIUM ION SECONDARY BATTERY

(71) Applicant: NIPPON ELECTRIC GLASS CO., LTD., Otsu (JP)

(72) Inventors: Junichi Ikejiri, Otsu (JP); Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 87 days.

(21) Appl. No.: 16/613,517

(22) PCT Filed: May 22, 2018

(86) PCT No.: PCT/JP2018/019586
§ 371 (c)(1),
(2) Date: Nov. 14, 2019

(87) PCT Pub. No.: WO2018/225494
PCT Pub. Date: Dec. 13, 2018

(65) Prior Publication Data
US 2021/0159547 A1    May 27, 2021

(30) Foreign Application Priority Data
Jun. 9, 2017  (JP) .............................. JP2017-114088

(51) Int. Cl.
*H01M 4/00* (2006.01)
*H01M 10/36* (2010.01)
(Continued)

(52) U.S. Cl.
CPC ......... *H01M 10/36* (2013.01); *H01M 4/0404* (2013.01); *H01M 4/366* (2013.01);
(Continued)

(58) Field of Classification Search
CPC .... H01M 4/0404; H01M 10/36; H01M 4/366; H01M 10/0562; H01M 10/0585; Y02E 60/10
See application file for complete search history.

(56) References Cited

U.S. PATENT DOCUMENTS

| | | |
|---|---|---|
| 2007/0259271 A1 | 11/2007 | Nanno et al. |
| 2012/0077095 A1* | 3/2012 | Roumi ................... H01M 4/04 429/405 |
| 2015/0076399 A1* | 3/2015 | Sugiyama ............... H01M 4/60 252/182.1 |
| 2015/0325844 A1 | 11/2015 | Inoue |

(Continued)

FOREIGN PATENT DOCUMENTS

| | | |
|---|---|---|
| JP | 05-205741 A | 8/1993 |
| JP | 11-238514 A | 8/1999 |

(Continued)

OTHER PUBLICATIONS

Official Communication issued in International Patent Application No. PCT/JP2018/019586, dated Jul. 10, 2018.
(Continued)

*Primary Examiner* — Cynthia H Kelly
*Assistant Examiner* — Monique M Wills
(74) *Attorney, Agent, or Firm* — Keating and Bennett, LLP

(57) ABSTRACT

Provided is an all-solid-state sodium ion secondary battery in which a current collector is difficult to peel from an electrode layer and which can suppress the decreases in discharge capacity and discharge voltage. An all-solid-state sodium ion secondary battery 1 according to the present invention includes: a solid electrolyte layer 2 made of a sodium ion-conductive oxide; a positive electrode layer 3 formed on a first principal surface 2a of the solid electrolyte layer 2; a negative electrode layer 4 formed on a second principal surface 2b of the solid electrolyte layer 2; and a current collector layer 5, 6 formed on a principal surface of at least one of the positive electrode layer 3 and the negative
(Continued)

electrode layer 4, wherein the current collector layer 5, 6 is made of at least one metallic material selected from the group consisting of aluminum, titanium, silver, copper, stainless steel, and alloys thereof, and the current collector layer 5, 6 has a thickness of not less than 10 nm and not more than 10 μm.

4 Claims, 1 Drawing Sheet

(51) Int. Cl.
    *H01M 4/04*     (2006.01)
    *H01M 4/36*     (2006.01)
    *H01M 4/02*     (2006.01)

(52) U.S. Cl.
    CPC ............... *H01M 2004/027* (2013.01); *H01M 2004/028* (2013.01); *H01M 2300/0071* (2013.01)

(56) References Cited

U.S. PATENT DOCUMENTS

2016/0064728 A1\* 3/2016 Nakayama ............ H01M 4/625
                                                                       429/231.1
2017/0005337 A1   1/2017 Ikejiri et al.
2018/0351200 A1\* 12/2018 Zhamu ............ H01M 10/0565

FOREIGN PATENT DOCUMENTS

| | | |
|---|---|---|
| JP | 2001-060453 A | 3/2001 |
| JP | 2010-080422 A | 4/2010 |
| JP | 2014-053181 A | 3/2014 |
| WO | 2006/064774 A1 | 6/2006 |
| WO | 2014/115604 A1 | 7/2014 |
| WO | 2015/087734 A1 | 6/2015 |

OTHER PUBLICATIONS

Official Communication issued in corresponding Chinese Patent Application No. 201880024998.5, dated Apr. 25, 2022.

\* cited by examiner

[FIG. 1]
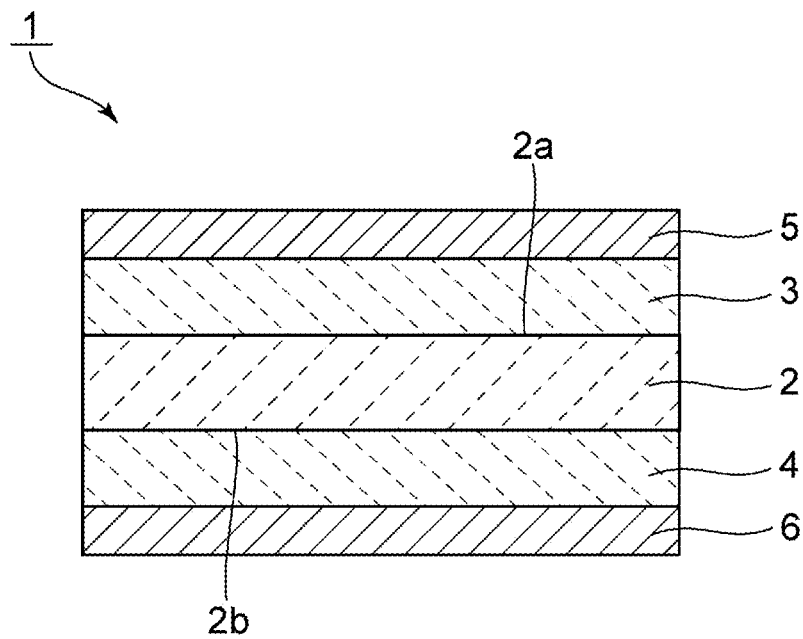
[FIG. 2]
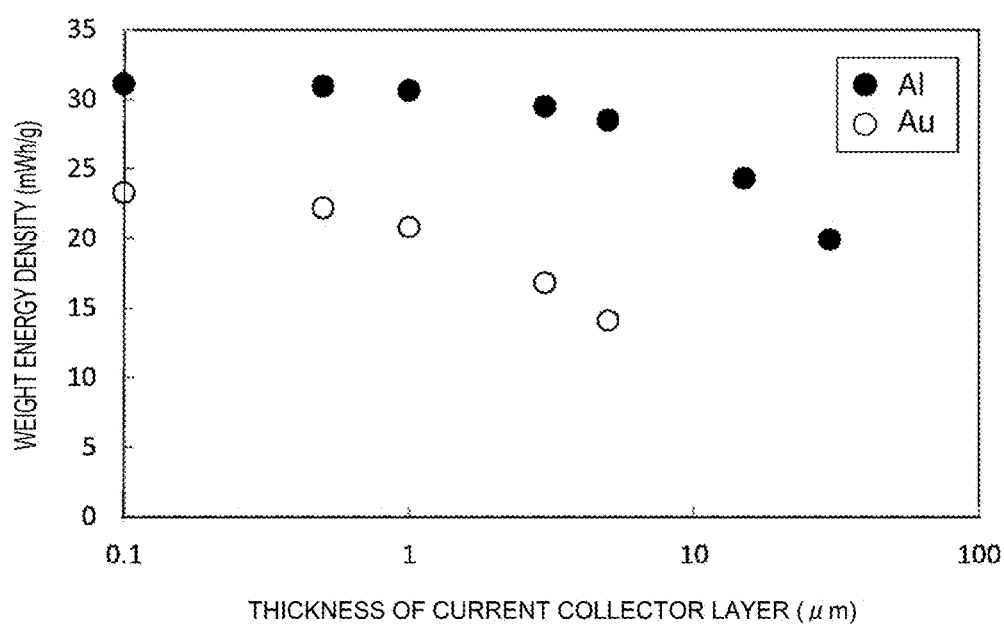

ALL-SOLID-STATE SODIUM ION SECONDARY BATTERY

TECHNICAL FIELD

The present invention relates to all-solid-state sodium ion secondary batteries including a solid electrolyte layer made of a sodium ion-conductive oxide.

BACKGROUND ART

Lithium ion secondary batteries are used as high-capacity and light-weight batteries in the fields of mobile devices, electric vehicles, and soon. However, in the lithium ion secondary batteries, flammable organic electrolytic solutions are mainly used as electrolytes. Although organic electrolytic solutions exhibit high ionic conductivity, their liquidity and flammability present safety problems, such as potential ignition and liquid leakage, upon application in power storage devices. To solve these safety problems, development of all-solid-state lithium ion secondary batteries employing a solid electrolyte instead of an organic electrolytic solution has been advanced (Patent Literature 1).

Meanwhile, in relation to lithium for use in all-solid-state lithium ion secondary batteries, there are concerns about global rise in raw material costs, global depletion of raw materials, and so on. In these circumstances, sodium ions are drawing attention as an alternative to lithium ions and development of all-solid-state sodium ion secondary batteries has also been advanced (Patent Literature 2).

In an all-solid-state sodium ion secondary battery disclosed in Patent Literature 2, both the surfaces of a sodium ion-conductive solid electrolyte layer are formed with respective electrode layers made of an electrode composite material (a positive electrode composite material or a negative electrode composite material). Furthermore, respective current collectors are formed on the electrode layers. In Patent Literature 2, a thin gold film deposited by sputtering is used as the current collector.

CITATION LIST

Patent Literature

PTL 1

JP-A-H05-205741

PTL 2

WO2015/087734

SUMMARY OF INVENTION

Technical Problem

However, in the all-solid-state sodium ion secondary battery disclosed in Patent Literature 2, the thin gold film serving as a current collector may be peeled from the electrode layer by friction during cell lamination or handling during transfer. If, as in this case, the current collector is peeled, the internal resistance of the battery increases, which presents a problem that the discharge capacity and discharge voltage decrease.

An object of the present invention is to provide an all-solid-state sodium ion secondary battery in which a current collector is difficult to peel from an electrode layer and which can suppress the decreases in discharge capacity and discharge voltage.

Solution to Problem

An all-solid-state sodium ion secondary battery according to the present invention includes: a solid electrolyte layer having a first principal surface and a second principal surface opposite each other and made of a sodium ion-conductive oxide; a positive electrode layer formed on the first principal surface of the solid electrolyte layer; a negative electrode layer formed on the second principal surface of the solid electrolyte layer; and a current collector layer formed on a principal surface of at least one of the positive electrode layer and the negative electrode layer, wherein the current collector layer is made of at least one metallic material selected from the group consisting of aluminum, titanium, silver, copper, stainless steel, and alloys thereof, and the current collector layer has a thickness of not less than 10 nm and not more than 10 µm.

In the all-solid-state sodium ion secondary battery according to the present invention, the current collector layer is preferably formed on each of the principal surfaces of both the positive electrode layer and the negative electrode layer.

In the all-solid-state sodium ion secondary battery according to the present invention, the current collector layer is preferably made of aluminum or an alloy containing aluminum.

In the all-solid-state sodium ion secondary battery according to the present invention, the solid electrolyte layer preferably contains at least one sodium ion-conductive oxide selected from β-alumina, β"-alumina, and NASICON crystals.

Advantageous Effects of Invention

The present invention enables provision of an all-solid-state sodium ion secondary battery in which a current collector is difficult to peel from an electrode layer and which can suppress the decreases in discharge capacity and discharge voltage.

BRIEF DESCRIPTION OF DRAWINGS

FIG. 1 is a schematic cross-sectional view showing an all-solid-state sodium ion secondary battery according to an embodiment of the present invention.

FIG. 2 is a graph showing the relationship between the thickness of a current collector layer formed on each of positive electrode layers produced in Examples and Comparative Examples and the weight energy density.

DESCRIPTION OF EMBODIMENTS

Hereinafter, a description will be given of a preferred embodiment. However, the following embodiment is merely illustrative and the present invention is not intended to be limited to the following embodiment. Throughout the drawings, members having substantially the same functions may be referred to by the same reference characters.

FIG. 1 is a schematic cross-sectional view showing an all-solid-state sodium ion secondary battery according to an embodiment of the present invention. As shown in FIG. 1, an all-solid-state sodium ion secondary battery 1 according to this embodiment includes a solid electrolyte layer 2, a positive electrode layer 3, a negative electrode layer 4, a first current collector layer 5, and a second current collector layer 6.

The solid electrolyte layer 2 is made of a sodium ion-conductive oxide. Furthermore, the solid electrolyte layer 2 has a first principal surface 2a and a second principal surface 2b opposite each other.

The positive electrode layer 3 is formed on the first principal surface 2a of the solid electrolyte layer 2. The positive electrode layer 3 contains a positive-electrode active material capable of absorbing and releasing sodium. The first current collector layer 5 is formed on a principal surface of the positive electrode layer 3 opposite to the solid electrolyte layer 2.

On the other hand, the negative electrode layer 4 is formed on the second principal surface 2b of the solid electrolyte layer 2. The negative electrode layer 4 contains a negative-electrode active material capable of absorbing and releasing sodium. The second current collector layer 6 is formed on a principal surface of the negative electrode layer 4 opposite to the solid electrolyte layer 2.

In this embodiment, the first current collector layer 5 is made of a metallic material, such as aluminum, titanium, silver, copper stainless steel or an alloy of any of them. The above metallic materials may be used singly or in a combination of a plurality of them. The alloy of any of them refers to an alloy containing at least one of the above metals. Furthermore, in this embodiment, the thickness of the first current collector layer 5 is not less than 10 nm and not more than 10 µm.

In this embodiment, the second current collector layer 6 is made of a metallic material, such as aluminum, titanium, silver, copper stainless steel or an alloy of any of them. The above metallic materials may be used singly or in a combination of a plurality of them. The alloy of any of them refers to an alloy containing at least one of the above metals. Furthermore, in this embodiment, the thickness of the second current collector layer 6 is not less than 10 nm and not more than 10 µm.

In the all-solid-state sodium ion secondary battery 1 according to this embodiment, the first current collector layer 5 and the second current collector layer 6 are made of a metallic material, such as aluminum, titanium, silver, copper stainless steel or an alloy of any of them. Therefore, the first current collector layer 5 and the second current collector layer 6 are difficult to peel from the positive electrode layer 3 and the negative electrode layer 4, respectively, by friction during cell lamination or handling during transfer. Since the first current collector layer 5 and the second current collector layer 6 are difficult to peel from the positive electrode layer 3 and the negative electrode layer 4, respectively, the intra-battery resistance of the all-solid-state sodium ion secondary battery 1 is less likely to increase and the discharge capacity and discharge voltage thereof are less likely to decrease.

The reason why in the all-solid-state sodium ion secondary battery 1 according to this embodiment the first current collector layer 5 and the second current collector layer 6 are difficult to peel from the positive electrode layer 3 and the negative electrode layer 4, respectively, can be explained as follows.

First, in the conventional all-solid-state sodium ion secondary battery, the current collector layer is made of gold as described previously. In this case, it can be considered that gold has low reactivity and is therefore bound to the electrode material by the van der Waals force only. Hence, its strength of binding to the electrode material is small, so that the current collector layer is peeled from the electrode layer by friction during cell lamination or handling during transfer.

Unlike the above, in the all-solid-state sodium ion secondary battery 1 according to this embodiment, the first current collector layer 5 and the second current collector layer 6 are each made of aluminum, titanium, silver, copper, stainless steel or an alloy of any of them. These metallic materials are easy to oxidize and therefore bind chemically to the electrode material forming the positive electrode layer 3 or the negative electrode layer 4. Hence, as compared to the case of use of gold, the strength of binding to the positive electrode layer 3 or the negative electrode layer 4 is large, so that the first current collector layer 5 and the second current collector layer 6 are difficult to peel from the positive electrode layer 3 and the negative electrode layer 4, respectively.

In addition, the above metallic materials forming the first current collector layer 5 and the second current collector layer 6 have lower densities than gold. Therefore, the all-solid-state sodium ion secondary battery 1 according to this embodiment also has the advantage of increasing the energy density per unit weight.

In further addition, in the all-solid-state sodium ion secondary battery 1 according to this embodiment, the thickness of each of the first current collector layer 5 and the second current collector layer 6 is not more than 10 µm, which is smaller than the thickness of the current collector layer of the conventional all-solid-state sodium ion secondary battery. Therefore, in the all-solid-state sodium ion secondary battery 1 according to this embodiment, the energy density per unit volume can also be increased. However, if the thickness of the current collector layer is too small, the electrical conductivity decreases to increase the intra-battery resistance and thus decrease the discharge capacity, so that eventually the weight energy density and volume energy density tend to decrease. To avoid this, in the all-solid-state sodium ion secondary battery 1 according to this embodiment, the thickness of each of the first current collector layer 5 and the second current collector layer 6 is limited to not less than 10 nm, which make the above problem unlikely to occur.

The first current collector layer 5 and the second current collector layer 6 are preferably each made of aluminum or an alloy containing aluminum. In this case, the energy density of the all-solid-state sodium ion secondary battery 1 can be further increased.

The thickness of each of the first current collector layer 5 and the second current collector layer 6 is preferably not more than 5 µm and more preferably not more than 1 µm. In this case, the energy density of the all-solid-state sodium ion secondary battery 1 can be further increased. Furthermore, the thickness of each of the first current collector layer 5 and the second current collector layer 6 is preferably not less than 30 nm and more preferably not less than 50 nm. In this case, it can be further suppressed that a decrease in electrical conductivity causes an increase in intra-battery resistance and thus a decrease in discharge capacity and the decrease in discharge capacity causes decreases in weight energy density and volume energy density.

In the present invention, it is preferred that, as in the above embodiment, both the first current collector layer 5 and the second current collector layer 6 be made of the above metallic material and the thicknesses of both the first current collector layer 5 and the second current collector layer 6 be in the above range.

However, in the present invention, it is also possible that only one of the first current collector layer and the second current collector is made of aluminum, titanium, silver, copper, stainless steel or an alloy of any of them and the thickness of the one current collector layer is not less than 10 nm and not more than 10 μm. Also in this case, the energy density of the all-solid-state sodium ion secondary battery 1 can be increased. In this case, the other current collector layer may be made of a different metallic material and may have a thickness out of the above range.

A description will be given below of the details of the solid electrolyte layer 2, the positive electrode layer 3, and the negative electrode layer 4 for use in the all-solid-state sodium ion secondary battery 1.

(Solid Electrolyte Layer)

A solid electrolyte forming the solid electrolyte layer 2 is made of a sodium ion-conductive oxide. Examples of the sodium ion-conductive oxide include compounds containing: at least one selected from the group consisting of Al, Y, Zr, Si, and P; Na; and O. The sodium ion-conductive oxide may be crystals, crystallized glass or glass, but crystals are preferred because they have relatively excellent ionic conductivity. Furthermore, crystals may be monocrystals or polycrystals, but monocrystals are more preferred from the viewpoint of having few grain boundaries and having excellent ionic conductivity. Specific examples of the compounds include oxide materials containing β-alumina, β"-alumina or NASICON crystals.

Examples of the oxide materials containing β-alumina or β"-alumina include those containing, in terms of % by mole, 65% to 98% $Al_2O_3$, 2% to 20% $Na_2O$, and 0.3% to 15% $MgO+Li_2O$. Reasons why the composition is limited as above will be described below. Note that in the following description "%" refers to "% by mole" unless otherwise stated. Furthermore, "(component)+(component)+ . . . " means the total sum of the contents of the relevant components.

$Al_2O_3$ is a main component of β-alumina or β"-alumina. The content of $Al_2O_3$ is preferably 65% to 98% and more preferably 70% to 95%. If $Al_2O_3$ is too little, the sodium ion conductivity is likely to decrease. On the other hand, if $Al_2O_3$ is too much, α-alumina, which has no sodium ion conductivity, remains, so that the sodium ion conductivity is likely to decrease.

$Na_2O$ is a component that gives sodium ion conductivity to the solid electrolyte. The content of $Na_2O$ is preferably 2% to 20%, more preferably 3% to 18%, and still more preferably 4% to 16%. If $Na_2O$ is too little, the above sodium ion conductivity is less likely to be obtained. On the other hand, if $Na_2O$ is too much, surplus sodium forms compounds not contributing to sodium ion conductivity, such as $NaAlO_2$, so that the sodium ion conductivity is likely to decrease.

MgO and $Li_2O$ are components (stabilizers) that stabilize the structures of β-alumina and β"-alumina. The content of $MgO+Li_2O$ is preferably 0.3% to 15%, more preferably 0.5% to 10%, and still more preferably 0.8% to 8%. If $MgO+Li_2O$ is too little, α-alumina remains in the solid electrolyte, so that the sodium ion conductivity is likely to decrease. On the other hand, if $MgO+Li_2O$ is too much, MgO or $Li_2O$ having failed to function as a stabilizer remains in the solid electrolyte, so that the sodium ion conductivity is likely to decrease.

The solid electrolyte preferably contains, in addition to the above components, $ZrO_2$ or $Y_2O_3$. $ZrO_2$ and $Y_2O_3$ have the effect of suppressing abnormal grain growth of β-alumina and/or β"-alumina during firing of raw materials to produce a solid electrolyte and thus further increasing the adhesion of particles of β-alumina and/or β"-alumina. The content of $ZrO_2$ is preferably 0% to 15%, more preferably 1% to 13%, and still more preferably 2% to 10%. The content of $Y_2O_3$ is preferably 0% to 5%, more preferably 0.01% to 4%, and still more preferably 0.02% to 3%. If $ZrO_2$ or $Y_2O_3$ is too much, the amount of β-alumina and/or β"-alumina produced decreases, so that the sodium ion conductivity is likely to decrease.

Examples of the oxide materials containing NASICON crystals include those containing crystals represented by a general formula $Na_sA1_tA2_uO_v$ (where A1 is at least one selected from the group consisting of Al, Y, Yb, Nd, Nb, Ti, Hf, and Zr, A2 is at least one selected from Si and P, s=1.4 to 5.2, t=1 to 2.9, u=2.8 to 4.1, and v=9 to 14). In the above general formula, A1 is preferably at least one selected from Y, Nb, Ti, and Zr. By doing so, crystals having more excellent sodium ion conductivity can be obtained.

The respective preferred ranges of values of the indices in the above general formula are as follows.

The index s is 1.4 to 5.2, preferably 2.5 to 3.5, and particularly preferably 2.8 to 3.1. If s is too small, the amount of sodium ions becomes small, so that the ionic conductivity is likely to decrease. On the other hand, if s is too large, surplus sodium forms compounds not contributing to ionic conductivity, such as sodium phosphate or sodium silicate, so that the ionic conductivity is likely to decrease.

The index t is 1 to 2.9, preferably 1 to 2.5, and particularly preferably 1.3 to 2. If t is too small, the amount of three-dimensional networks in crystals decreases, so that the ionic conductivity is likely to decrease. On the other hand, if t is too large, compounds not contributing to ionic conductivity, such as zirconia or alumina, are formed, so that the ionic conductivity is likely to decrease.

The index u is 2.8 to 4.1, preferably 2.9 to 3.2, and particularly preferably 2.95 to 3.1. If u is too small, the amount of three-dimensional networks in crystals decreases, so that the ionic conductivity is likely to decrease. On the other hand, if u is too large, crystals not contributing to ionic conductivity are formed, so that the ionic conductivity is likely to decrease.

The index v is 9 to 14, preferably 9 to 12, more preferably 9.5 to 12, and particularly preferably 11 to 12. If v is too small, the valence of the aluminum component becomes low, so that the electrical insulation is likely to decrease. On the other hand, if v is too large, the oxide material becomes excessively oxidative and sodium ions are bound to the lone pairs of electrons of oxide atoms, so that the ionic conductivity is likely to decrease.

The NASICON crystals are preferably monoclinic or trigonal crystals because they have excellent ionic conductivity.

Specific examples of the crystal represented by the above general formula $Na_sA1_tA2_uO_v$ include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$.

The thickness of the solid electrolyte layer 2 is preferably in a range of 10 μm to 2000 μm and more preferably in a range of 50 μm to 200 μm. If the thickness of the solid electrolyte layer 2 is too small, the mechanical strength decreases and the solid electrolyte layer 2 is thus liable to breakage, so that an internal short-circuit is likely to develop. If the thickness of the solid electrolyte layer 2 is too large, the distance of sodium ion conduction accompanying charge and discharge becomes long and the internal resistance therefore becomes high, so that the discharge capacity and the operating voltage are likely to decrease. In addition, the energy density of the all-solid-state sodium ion secondary battery 1 per unit volume may decrease.

The solid electrolyte layer 2 can be produced by mixing raw material powders, forming the mixed raw material powders into a shape, and then firing them. For example, the solid electrolyte layer 2 can be produced by making the raw material powders into a slurry, forming a green sheet from the slurry, and then firing the green sheet. Alternatively, the solid electrolyte layer 2 may be produced by the sol-gel method.

(Positive Electrode Layer)

No particular limitation is placed on the type of the positive electrode layer 3 to be used so long as it contains a positive-electrode active material capable of absorbing and releasing sodium and functions as a positive electrode layer. The positive-electrode active material may be formed, for example, by firing a positive-electrode active material precursor powder, such as a glass powder. When the positive-electrode active material precursor powder is fired, the positive-electrode active material crystals precipitate and these positive-electrode active material crystals function as a positive-electrode active material.

Examples of the positive-electrode active material crystals functioning as a positive-electrode active material include sodium transition metal phosphate crystals containing Na, M (where M represents at least one transition metal element selected from Cr, Fe, Mn, Co, V, and Ni), P, and O. Specific examples include $Na_2FeP_2O_7$, $NaFePO_4$, $Na_3V_2(PO_4)_3$, $Na_2NiP_2O_7$, $Na_{3.64}Ni_{2.18}(P_2O_7)_2$, and $Na_3Ni_3(PO_4)_2(P_2O_7)$. These sodium transition metal phosphate crystals are preferred because they have high capacities and excellent chemical stability. Preferred among them are triclinic crystals belonging to space group P1 or P-1 and particularly preferred are crystals represented by a general formula $Na_xM_yP_2O_z$ (where $1.2 \leq x \leq 2.8$, $0.95 \leq y \leq 1.6$, and $6.5 \leq z \leq 8$), because these crystals have excellent cycle characteristics. Other positive-electrode active material crystals functioning as a positive-electrode active material include layered sodium transition metal oxide crystals, such as $NaCrO_2$, $Na_{0.7}MnO_2$, and $NaFe_{0.2}Mn_{0.4}Ni_{0.4}O_2$.

Examples of the positive-electrode active material precursor powder include those containing (i) at least one transition metal element selected from the group consisting of Cr, Fe, Mn, Co, Ni, Ti, and Nb, (ii) at least one element from P, Si, and B, and (iii) O.

Examples of the positive-electrode active material precursor powder include those containing, particularly in terms of % by mole of oxide, 8% to 55% $Na_2O$, 10% to 70% $CrO+FeO+MnO+CoO+NiO$, and 15% to 70% $P_2O_5+SiO_2+B_2O_3$. Reasons why each of the components is limited as above will be described below. Note that in the following description of the content of each component "%" refers to "% by mole" unless otherwise stated. Furthermore, "(component)+(component)+ . . . " means the total sum of the contents of the relevant components.

$Na_2O$ serves, during charge and discharge, as a supply source of sodium ions that move between the positive-electrode active material and a negative-electrode active material. The content of $Na_2O$ is preferably 8% to 55%, more preferably 15% to 45%, and still more preferably 25% to 35%. If $Na_2O$ is too little, the amount of sodium ions contributing to the absorption and release becomes small, so that the discharge capacity tends to decrease. On the other hand, if $Na_2O$ is too much, other crystals not contributing to charge and discharge, such as $Na_3PO_4$, becomes likely to precipitate, so that the discharge capacity tends to decrease.

CrO, FeO, MnO, CoO, and NiO are components that change the valence of each transition element during charge and discharge to cause a redox reaction and thus act as a drive force for absorption and release of sodium ions. Among them, NiO and MnO have a significant effect of increasing the redox potential. Furthermore, FeO is particularly likely to stabilize the structure during charge and discharge and therefore likely to improve the cycle characteristics. The content of $CrO+FeO+MnO+CoO+NiO$ is preferably 10% to 70%, more preferably 15% to 60%, still more preferably 20% to 55%, yet still more preferably 23% to 50%, particularly preferably 25% to 40%, and most preferably 26% to 36%. If $CrO+FeO+MnO+CoO+NiO$ is too little, the redox reaction accompanying charge and discharge becomes less likely to occur and the amount of sodium ions to be absorbed and released therefore becomes small, so that the discharge capacity tends to decrease. On the other hand, if $CrO+FeO+MnO+CoO+NiO$ is too much, other crystals precipitate, so that the discharge capacity tends to decrease.

$P_2O_5$, $SiO_2$, and $B_2O_3$ each form a three-dimensional network and, therefore, have the effect of stabilizing the structure of the positive-electrode active material. Particularly, $P_2O_5$ and $SiO_2$ are preferred because they have excellent sodium ion conductivity, and $P_2O_5$ is more preferred. The content of $P_2O_5+SiO_2+B_2O_3$ is preferably 15% to 70%, more preferably 20% to 60%, and still more preferably 25% to 45%. If $P_2O_5+SiO_2+B_2O_3$ is too little, the discharge capacity tends to decrease after repeated charge and discharge. On the other hand, if $P_2O_5+SiO_2+B_2O_3$ is too much, other crystals not contributing to charge and discharge, such as $P_2O_5$, tends to precipitate. The content of each of $P_2O_5$, $SiO_2$, and $B_2O_3$ components is preferably 0% to 70%, more preferably 15% to 70%, still more preferably 20% to 60%, and particularly preferably 25% to 45%.

Furthermore, in addition to the above components, various components can be incorporated into the positive-electrode active material without impairing the effects as the positive-electrode active material, so that vitrification can be facilitated. Examples of such components include, in terms of oxides, MgO, CaO, SrO, BaO, ZnO, CuO, $Al_2O_3$, $GeO_2$, $Nb_2O_5$, $TiO_2$, $ZrO_2$, $V_2O_5$, and $Sb_2O_5$. Particularly, $Al_2O_3$ acting as a network forming oxide and $V_2O_5$ serving as an active material component are preferred. The content of the above components is, in total, preferably 0% to 30%, more preferably 0.1% to 20%, and still more preferably 0.5% to 10%.

The preferred positive-electrode active material precursor powder is one capable of forming an amorphous phase together with positive-electrode active material crystals when subjected to firing. When an amorphous phase is formed, the sodium ion conductivity through the positive electrode layer 3 and at the interface between the positive electrode layer 3 and the solid electrolyte layer 2 can be improved.

The average particle diameter of the positive-electrode active material precursor powder is preferably 0.01 μm to 15 μm, more preferably 0.05 μm to 12 μm, and still more preferably 0.1 μm to 10 μm. If the average particle diameter of the positive-electrode active material precursor powder is too small, the cohesion between the positive-electrode active material precursor powder increases, so that the positive-electrode active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the positive electrode layer 3 is preferably in a range of 3 µm to 300 µm and more preferably in a range of 10 µm to 150 µm. If the thickness of the positive electrode layer 3 is too small, the capacity of the all-solid-state sodium ion secondary battery 1 itself becomes small, so that the energy density may decrease. If the thickness of the positive electrode layer 3 is too large, the resistance to electron conduction becomes large, so that the discharge capacity and the operating voltage tend to decrease.

The positive electrode layer 3 may contain, if necessary, a solid electrolyte powder. Therefore, the positive electrode layer 3 may be a positive electrode composite material which is a composite material of the positive-electrode active material and the solid electrolyte powder. The solid electrolyte powder that can be used is a powder of the same material as used for the above-described solid electrolyte layer 2. When the positive electrode layer 3 contains the solid electrolyte powder, the sodium ion conductivity through the positive electrode layer 3 and at the interface between the positive electrode layer 3 and the solid electrolyte layer 2 can be improved. The average particle diameter of the solid electrolyte powder is preferably 0.01 µm to 15 µm, more preferably 0.05 µm to 10 µm, and still more preferably 0.1 µm to 5 µm.

If the average particle diameter of the solid electrolyte powder is too large, the distance taken to conduct sodium ions becomes long, so that the sodium ion conductivity tends to decrease. In addition, the sodium ion conducting path between the positive-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction thereof with carbon dioxide may occur, so that the sodium ion conductivity is likely to decrease. In addition, voids are likely to be formed, so that the electrode density is likely to decrease. As a result, the discharge capacity tends to decrease.

The volume ratio between the positive-electrode active material precursor powder and the solid electrolyte powder is preferably 20:80 to 95:5, more preferably 30:70 to 90:10, and still more preferably 35:65 to 88:12.

Furthermore, the positive electrode layer 3 may contain, if necessary, a conductive aid, such as carbon powder, and a binder. When a conductive aid is contained in the positive electrode layer 3, the internal resistance of the positive electrode layer 3 can be reduced. The conductive aid is preferably contained in a proportion of 0% to 20% by mass in the positive electrode layer 3 and more preferably contained in a proportion of 1% to 10% by mass.

The preferred binder is polypropylene carbonate (PPC), which is capable of decomposing at low temperatures under an inert atmosphere. Alternatively, carboxymethyl cellulose (CMC), which has excellent sodium ion conductivity, is also preferred.

The positive electrode layer 3 can be produced using a slurry containing the active material precursor powder and, if necessary, further containing the solid electrolyte powder and/or the conductive aid in the above proportion. If necessary, a binder, a plasticizer, a solvent, and other additives are added into the slurry. The positive electrode layer 3 can be produced by applying the slurry, drying it, and then firing it. Alternatively, the positive electrode layer 3 may be produced by applying the slurry onto a base material made of PET (polyethylene terephthalate) or other materials, drying the slurry to obtain a green sheet, and then firing the green sheet.

(Negative Electrode Layer)

No particular limitation is placed on the type of the negative electrode layer 4 to be used so long as it contains a negative-electrode active material capable of absorbing and releasing sodium and functions as a negative electrode layer. The negative-electrode active material may be formed, for example, by firing a negative-electrode active material precursor powder, such as a glass powder. When the negative-electrode active material precursor powder is fired, the negative-electrode active material crystals precipitate and these negative-electrode active material crystals function as a negative-electrode active material.

Examples of the negative-electrode active material crystals functioning as a negative-electrode active material include: crystals containing at least one selected from Nb and Ti, and O; metallic crystals of at least one selected from Sn, Bi, and Sb; and alloy crystals containing at least one selected from Sn, Bi, and Sb.

The crystals containing at least one selected from Nb and Ti, and O are preferred because they have excellent cycle characteristics. If the crystals containing at least one selected from Nb and Ti, and O further contain Na and/or Li, this is preferred because the charge/discharge efficiency (the proportion of discharge capacity to charge capacity) increases and a high charge/discharge capacity can be thus maintained. Above all, if the crystals containing at least one selected from Nb and Ti, and O are orthorhombic, hexagonal, cubic or monoclinic crystals, particularly monoclinic crystals belonging to space group $P2_1/m$, this is more preferred because a capacity decrease is less likely to occur even during charge and discharge at a large current.

An example of the orthorhombic crystals is $NaTi_2O_4$. Examples of the hexagonal crystals include $Na_2TiO_3$, $NaTi_8O_{13}$, $NaTiO_2$, $LiNbO_3$, $LiNbO_2$, $Li_7NbO_6$, and $Li_2Ti_3O_7$. Examples of the cubic crystals include $Na_2TiO_3$, $NaNbO_3$, $Li_4Ti_5O_{12}$, and $Li_3NbO_4$. Examples of the monoclinic crystals include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Na_2Ti_3O_7$, $Li_{1.7}Nb_2O_5$, $Li_{1.9}Nb_2O_5$, $Li_{12}Nb_{13}O_{33}$, and $LiNb_3O_8$. An example of the monoclinic crystals belonging to space group $P2_1/m$ is $Na_2Ti_3O_7$.

The crystals containing at least one selected from Nb and Ti, and O preferably further contains at least one selected from B, Si, P, and Ge. These components have the effect of facilitating the formation of an amorphous phase together with the negative-electrode active material crystals and further increasing the sodium ion conductivity.

Other negative-electrode active materials that can be used include metallic crystals of at least one selected from Sn, Bi, and Sb, alloy crystals containing at least one selected from Sn, Bi, and Sb (for example, Sn—Cu alloy, Bi—Cu alloy, and Bi—Zn alloy), and glasses containing at least one selected from Sn, Bi, and Sb. These materials are preferred because they have high capacity and they are less likely to cause a capacity decrease even during charge and discharge at a large current.

Examples of the negative-electrode active material precursor powder include those containing, in terms of % by mole of oxide, 0% to 90% SnO, 0% to 90% $Bi_2O_3$, 0% to 90% $TiO_2$, 0% to 90% $Fe_2O_3$, 0% to 90% $Nb_2O_5$, 5% to 75% $Si_2+B_2O_3+P_2O_5$, and 0% to 80% $Na_2O$. With the above composition, a structure is formed in which Sn ions, Bi ions, Ti ions, Fe ions or Nb ions each serving as a negative-electrode active material component are homogeneously dispersed in an oxide matrix containing Si, B or P. Furthermore, when containing $Na_2O$, the negative-electrode active material precursor powder becomes a material having more excellent sodium ion conductivity. As a result, a negative-electrode active material can be obtained which can suppress a volume change during absorption and release of sodium ions and has more excellent cycle characteristics.

Reasons why the composition of the negative-electrode active material precursor powder is limited as above will be described below. Note that in the following description "%" refers to "% by mole" unless otherwise stated. Furthermore, "(component)+(component)+ . . . " means the total sum of the contents of the relevant components.

SnO, $Bi_2O_3$, $TiO_2$, $Fe_2O_3$, and $Nb_2O_5$ are negative-electrode active material components serving as sites where alkali ions are absorbed and released. When the negative-electrode active material precursor powder contains any of these components, the discharge capacity of the negative-electrode active material per unit mass becomes larger and the charge/discharge efficiency (the proportion of discharge capacity to charge capacity) at the first charge and discharge is more likely to be increased. However, if the content of these components is too large, the volume change due to absorption and release of sodium ions during charge and discharge becomes unable to be reduced, so that the cycle characteristics tend to decrease. In view of the above circumstances, the respective preferred ranges of contents of the above components are as follows.

The content of SnO is preferably 0% to 90%, more preferably 45% to 85%, still more preferably 55% to 75%, and particularly preferably 60% to 72%.

The content of $Bi_2O_3$ is preferably 0% to 90%, more preferably 10% to 70%, still more preferably 15% to 65%, and particularly preferably 25% to 55%.

The content of $TiO_2$ is preferably 0% to 90%, more preferably 5% to 72%, still more preferably 10% to 68%, yet still more preferably 12% to 58%, particularly preferably 15% to 49%, and most preferably 15% to 39%.

The content of $Fe_2O_3$ is preferably 0% to 90%, more preferably 15% to 85%, still more preferably 20% to 80%, and particularly preferably 25% to 75%.

The content of $Nb_2O_5$ is preferably 0% to 90%, more preferably 7% to 79%, still more preferably 9% to 69%, yet still more preferably 11% to 59%, particularly preferably 13% to 49%, and most preferably 15% to 39%. Note that that $SnO+Bi_2O_3+TiO_2+Fe_2O_3+Nb_2O_5$ is preferably 0% to 90%, more preferably 5% to 85%, and still more preferably 10% to 80%.

$SiO_2$, $B_2O_3$, and $P_2O_5$ are network forming oxides and have the effect of surrounding sodium-ion absorption and release sites in the above negative active material components to further increase the cycle characteristics. Among them, $SiO_2$ and $P_2O_5$ not only further increase the cycle characteristics but also have excellent sodium ion conductivity, and therefore have the effect of further increasing the rate characteristic.

$SiO_2+B_2O_3+P_2O_5$ is preferably 5% to 85%, more preferably 6% to 79%, still more preferably 7% to 69%, yet still more preferably 8% to 59%, particularly preferably 9% to 49%, and most preferably 10% to 39%. If $SiO_2+B_2O_3+P_2O_5$ is too little, the volume change of the negative-electrode active material components due to absorption and release of sodium ions during charge and discharge becomes unable to be reduced, so that a structural collapse occurs and, thus, the cycle characteristics is likely to decrease. On the other hand, if $SiO_2+B_2O_3+P_2O_5$ is too much, the content of the negative-electrode active material components becomes relatively small, so that the charge/discharge capacity of the negative-electrode active material per unit mass tends to be small.

The respective preferred ranges of contents of $SiO_2$, $B_2O_3$, and $P_2O_5$ are as follows.

The content of $SiO_2$ is preferably 0% to 75%, more preferably 5% to 75%, still more preferably 7% to 60%, yet still more preferably 10% to 50%, particularly preferably 12% to 40%, and most preferably 20% to 35%. If the content of $SiO_2$ is too large, the discharge capacity is likely to decrease.

The content of $P_2O_5$ is preferably 5% to 75%, more preferably 7% to 60%, still more preferably 10% to 50%, particularly preferably 12% to 40%, and most preferably 20% to 35%. If the content of $P_2O_5$ is too small, the above cycle characteristics are less likely to be obtained. On the other hand, if the content of $P_2O_5$ is too large, the discharge capacity is likely to decrease and the water resistance is likely to decrease. In addition, upon preparation of an aqueous electrode paste, undesirable other crystals are produced to thus break the $P_2O_5$ network, so that the cycle characteristics are likely to decrease.

The content of $B_2O_3$ is preferably 0% to 75%, more preferably 5% to 75%, still more preferably 7% to 60%, yet still more preferably 10% to 50%, particularly preferably 12% to 40%, and most preferably 20% to 35%. If the content of $B_2O_3$ is too large, the discharge capacity is likely to decrease and the chemical durability is likely to decrease.

The preferred negative-electrode active material precursor powder is one capable of forming an amorphous phase together with negative-electrode active material crystals when subjected to firing. When an amorphous phase is formed, the sodium ion conductivity through the negative electrode layer 4 and at the interface between the negative electrode layer 4 and the solid electrolyte layer 2 can be improved.

The average particle diameter of the negative-electrode active material precursor powder is preferably 0.01 μm to 15 μm, more preferably 0.05 μm to 12 μm, and still more preferably 0.1 μm to 10 μm. If the average particle diameter of the negative-electrode active material precursor powder is too small, the cohesion between the negative-electrode active material precursor powder increases, so that the negative-electrode active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the negative-electrode active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the negative electrode layer 4 is preferably in a range of 0.3 μm to 300 μm and more preferably in a range of 3 μm to 150 μm. If the thickness of the negative electrode layer 4 is too small, the absolute capacity (mAh) of the negative electrode tends to decrease. If the thickness of the negative electrode layer 4 is too large, the resistance becomes large, so that the capacity (mAh/g) tends to decrease.

The negative electrode layer 4 may contain a solid electrolyte powder, a conductive aid, a binder, and so on. When the negative electrode layer 4 contains the solid electrolyte powder to be a negative electrode composite material, the contact interface between the negative-electrode active material and the solid electrolyte powder increases to facilitate the absorption and release of sodium ions during charge and discharge, so that the rate characteristic can be further improved.

The solid electrolyte powder that can be used is a powder of the same material as used for the above-described solid electrolyte layer 2. The average particle diameter of the solid electrolyte powder is preferably 0.01 μm to 15 μm, more preferably 0.05 μm to 10 μm, and still more preferably 0.1 μm to 5 μm.

If the average particle diameter of the solid electrolyte powder is too large, the distance taken to conduct sodium ions becomes long, so that the sodium ion conductivity tends to decrease. In addition, the sodium ion conducting path between the negative-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction thereof with carbon dioxide may occur, so that the sodium ion conductivity is likely to decrease. In addition, voids are likely to be formed, so that the electrode density is likely to decrease. As a result, the discharge capacity tends to decrease.

The volume ratio between the negative-electrode active material precursor powder and the solid electrolyte powder is preferably 20:80 to 95:5, more preferably 30:70 to 90:10, and still more preferably 35:65 to 88:12.

An example of the conductive aid is carbon powder. When a conductive aid is contained in the negative electrode layer 4, the internal resistance of the negative electrode layer 4 can be reduced. The conductive aid is preferably contained in a proportion of 0% to 20% by mass in the negative electrode layer 4 and more preferably contained in a proportion of 1% to 10% by mass.

The preferred binder is polypropylene carbonate (PPC), which is capable of decomposing at low temperatures under an inert atmosphere. Alternatively, carboxymethyl cellulose (CMC), which has an excellent ionic conductivity, is also preferred.

The negative electrode layer 4 can be produced using a slurry containing the negative-electrode active material precursor powder and, if necessary, further containing the solid electrolyte powder and/or the conductive aid in the above proportion. If necessary, a binder, a plasticizer, a solvent, and other additives are added into the slurry. The negative electrode layer 4 can be produced by applying the slurry, drying it, and then firing it. Alternatively, the negative electrode layer 4 may be produced by applying the slurry onto a base material made of PET (polyethylene terephthalate) or other materials, drying the slurry to obtain a green sheet from the slurry, and then firing the green sheet.

A description will be given below of an example of a method for producing the all-solid-state sodium ion secondary battery 1.

(Method for Producing All-Solid-State Sodium Ion Secondary Battery)

No particular limitation is placed on the method for producing the all-solid-state sodium ion secondary battery 1 shown in FIG. 1.

For example, first, the positive electrode layer 3 is formed on the first principal surface 2a of the solid electrolyte layer 2 and the negative electrode layer 4 is then formed on the second principal surface 2b. In this case, the positive electrode layer 3 may be formed by applying a slurry for forming a positive electrode layer onto the first principal surface 2a of the solid electrolyte layer 2, drying the slurry, and then firing the slurry. Next, the negative electrode layer 4 may be formed by applying a slurry for forming a negative electrode layer onto the second principal surface 2b of the solid electrolyte layer 2, drying the slurry, and then firing the slurry. However, the positive electrode layer 3 and the negative electrode layer 4 may be formed by concurrent firing.

Alternatively, the negative electrode layer 4, the solid electrolyte layer 2, and the positive electrode layer 3 may be formed concurrently by laying a green sheet for forming a negative electrode layer, a green sheet for forming a solid electrolyte layer, and a green sheet for forming a positive electrode layer one on top of another in this order and firing these green sheets.

Next, the first current collector layer 5 and the second current collector layer 6 are formed. No particular limitation is placed on the method for forming the first current collector layer 5 and the second current collector layer 6 and examples include: physical vapor deposition methods, such as evaporation coating and sputtering; and chemical vapor deposition methods, such as thermal CVD, MOCVD, and plasma CVD. Other methods for forming the first current collector layer 5 and the second current collector layer 6 include liquid phase deposition methods, such as plating, the sol-gel method, and spin coating. However, it is preferred to form the first current collector layer 5 and the second current collector layer 6 on the positive electrode layer 3 and the negative electrode layer 4, respectively, by sputtering, because excellent adhesion is achieved. After the positive electrode layer 3 and the negative electrode layer 4 are formed on the solid electrolyte layer 2, the first current collector layer 5 and the second current collector layer 6 may be formed separately from each other. Alternatively, the all-solid-state sodium ion secondary battery 1 may be obtained by previously producing the first current collector layer 5 on the positive electrode layer 3, also producing the second current collector layer 6 on the negative electrode layer 4, and then combining them.

EXAMPLES

Hereinafter, a description will be given of the present invention with reference to its examples, but the present invention is not limited to these examples.

(a) Preparation of Solid Electrolyte Powder (a-1) Preparation of Solid Electrolyte Powder A Using sodium carbonate ($Na_2CO_3$), sodium hydrogen carbonate ($NaHCO_3$), magnesium oxide (MgO), aluminum oxide ($Al_2O_3$), zirconium oxide ($ZrO_2$), and yttrium oxide ($Y_2O_3$), powders of these raw materials were formulated to give a composition of, in terms of % by mole, 14.2% $Na_2O$, 5.5% MgO, 75.4% $Al_2O_3$, 4.7% $ZrO_2$, and 0.2% $Y_2O_3$. The raw material powders were formed into a shape by uniaxial pressing at 40 MPa using a 20 mm diameter die and then fired at 1600° C. for 30 minutes, thus obtaining β"-alumina.

The handling of the fired β"-alumina was performed in an atmosphere of the dew point minus 40° C. or below.

The obtained β"-alumina was ground with an alumina pestle in an aluminum mortar and the ground product was passed through a mesh with 300-μm openings. The powder having passed through the mesh was further ground, with a "planetary ball mill P6" manufactured by Fritsch GmbH and loaded with 5-mm diameter YTZ (yttria-stabilized zirconia) balls, at 300 rpm for 30 minutes (with a 15-minute pause every 15 minutes), and then passed through a mesh with 20-μm openings. Thereafter, the powder was air-classified with an air classifier ("type MDS-1" manufactured by Nippon Pneumatic Mfg. Co., Ltd.), thus obtaining a solid electrolyte powder A made of β"-alumina. All the above works were conducted in an atmosphere of the dew point minus 40° C. or below.

(a-2) Preparation of Solid Electrolyte Powder B

Using sodium carbonate ($Na_2CO_3$), yttria-stabilized zirconia (($ZrO_2)_{0.97}(Y_2O_3)_{0.03}$), silicon dioxide ($SiO_2$), and sodium metaphosphate ($NaPO_3$), powders of these raw materials were formulated to give a composition of, in terms of % by mole, 25.3% $Na_2O$, 31.6% $ZrO_2$, 1% $Y_2O_3$, 33.7% $SiO_2$, and 8.4% $P_2O_5$. Next, the raw material powders were wet mixed for four hours using ethanol as a medium. Thereafter, ethanol was evaporated from the raw material powders and the raw material powders were pre-fired at 1100° C. for eight hours and then air-classified with an air classifier (type MDS-3 manufactured by Nippon Pneumatic Mfg. Co., Ltd.). The classified powder was formed into a shape by uniaxial pressing at 40 MPa using a 20 mm diameter die and then thermally treated at 1220° C. for 40 hours, thus obtaining a solid electrolyte containing NASICON crystals. All the above works were conducted in an atmosphere of the dew point minus 40° C. or below.

The obtained solid electrolyte was ground with an alumina-made pestle in an aluminum-made mortar and the ground product was passed through a mesh with 300-μm openings. The obtained powder was further ground, with a planetary ball mill P6 manufactured by Fritsch GmbH and loaded with 5-mm diameter $ZrO_2$ balls, at 300 rpm for 30 minutes (with a 15-minute pause every 15 minutes), and then passed through a mesh with 20-μm openings. Thereafter, the powder was air-classified with an air classifier (type MDS-3 manufactured by Nippon Pneumatic Mfg. Co., Ltd.), thus obtaining a solid electrolyte powder B containing NASICON crystals.

(b) Production of Solid Electrolyte Layer (b-1) Production of Solid Electrolyte Layer A Using sodium carbonate ($Na_2CO_3$), sodium hydrogen carbonate ($NaHCO_3$), magnesium oxide (MgO), aluminum oxide ($Al_2O_3$), zirconium oxide ($ZrO_2$), and yttrium oxide ($Y_2O_3$), powders of these raw materials were formulated to give a composition of, in terms of % by mole, 14.2% $Na_2O$, 5.5% MgO, 75.4% $Al_2O_3$, 4.7% $ZrO_2$, and 0.2% $Y_2O_3$. Thereafter, the raw material powders were wet mixed for four hours using ethanol as a medium. After ethanol was evaporated from the raw material powder mixture, an acrylic acid ester-based copolymer ("OLYCOX 1700" manufactured by Kyoeisha Chemical Co., Ltd.) as a binder and benzyl butyl phthalate as a plasticizer were used with the mixture, and these materials were weighed to give a ratio of raw material powders to binder to plasticizer of 83.5:15:1.5 (mass ratio) and dispersed into N-methylpyrrolidinone, followed by well stirring with a planetary centrifugal mixer to form a slurry.

The slurry obtained as above was applied onto a PET film using a doctor blade with a gap of 250 μm and dried at 70° C., thus obtaining a green sheet. Thereafter, the obtained green sheet was pressed at 90° C. and 40 MPa for five minutes using an isostatic pressing apparatus.

The pressed green sheet was fired at 1600° C. for 30 minutes, thus obtaining a 50 μm thick solid electrolyte layer A made of β"-alumina. The handling of the fired solid electrolyte layer was performed in an atmosphere of the dew point minus 40° C. or below.

(b-2) Production of Solid Electrolyte Layer B

Using sodium carbonate ($Na_2CO_3$), yttria-stabilized zirconia (($ZrO_2)_{0.97}(Y_2O_3)_{0.03}$), silicon dioxide ($SiO_2$), and sodium metaphosphate ($NaPO_3$), powders of these raw materials were formulated to give a composition of, in terms of % by mole, 25.3% $Na_2O$, 31.6% $ZrO_2$, 1% $Y_2O_3$, 33.7% $SiO_2$, and 8.4% $P_2O_5$. Next, the raw material powders were wet mixed for four hours using ethanol as a medium. Thereafter, ethanol was evaporated from the raw material powders and the raw material powders were pre-fired at 1100° C. for eight hours and then air-classified with an air classifier (type MDS-3 manufactured by Nippon Pneumatic Mfg. Co., Ltd.). The classified powders, an acrylic acid ester-based copolymer (OLYCOX KC-7000 manufactured by Kyoeisha Chemical Co., Ltd.) as a binder, and benzyl butyl phthalate as a plasticizer were weighed to give a ratio of raw material powders to binder to plasticizer of 83.5:15:1.5 (mass ratio) and dispersed into N-methylpyrrolidinone, followed by well stirring with a planetary centrifugal mixer to form a slurry.

The slurry obtained as above was applied onto a PET film using a doctor blade with a gap of 350 μm and dried at 70° C., thus obtaining a green sheet. The obtained green sheet was pressed at 90° C. and 40 MPa for five minutes using an isostatic pressing apparatus. The pressed green sheet was fired at 1220° C. for 40 hours in an atmosphere of the dew point minus 40° C. or below, thus obtaining a 70 μm thick solid electrolyte layer B containing NASICON crystals.

(c) Preparation of Active Material Precursor Powder (c-1) Preparation of Positive-Electrode Active Material Precursor Powder Using various oxides, a carbonate material, and so on as raw materials, powders of these raw materials were formulated to give the composition shown in Tables 1 and 2 below. The raw material powders were loaded into a platinum crucible and melted at 1200° C. to 1500° C. for 90 minutes in an air atmosphere using an electric furnace. Next, resultant molten glass was poured between a pair of rotating rollers and formed into a shape with rapid cooling, thus obtaining a film-like glass body having a thickness of 0.1 mm to 2 mm.

The obtained film-like glass body was ground for five hours with a ball mill using 20-mm diameter $ZrO_2$ balls and the ground product was passed through a resin-made sieve with 120-μm openings, thus obtaining a coarse glass powder having an average particle diameter of 3 μm to 15 μm. Next, the coarse glass powder was ground, using ethanol as a grinding aid, for 80 hours with a ball mill using 3-mm diameter $ZrO_2$ balls, thus obtaining a glass powder (positive-electrode active material precursor powder) having an average particle diameter of 0.7 μm.

(c-2) Preparation of Negative-Electrode Active Material Precursor Powder

Using various oxides, a carbonate material, and so on as raw materials, powders of these raw materials were formulated to give the composition shown in Tables 3 and 4 below. The raw material powders were loaded into a platinum crucible and melted at 1300° C. for an hour using an electric furnace. Thereafter, resultant molten glass was poured between a pair of rotating rollers and formed into a shape with rapid cooling, thus obtaining a film-like glass body having a thickness of 0.1 mm to 2 mm.

The obtained film-like glass body was ground for five hours with a ball mill using 20-mm diameter $ZrO_2$ balls and the ground product was passed through a resin-made sieve with 120-μm openings, thus obtaining a coarse glass powder having an average particle diameter of 3 μm to 15 μm. Next, the coarse glass powder was ground, using ethanol as a grinding aid, for 80 hours with a ball mill using 3-mm diameter $ZrO_2$ balls, thus obtaining a glass powder (negative-electrode active material precursor powder) having an average particle diameter of 0.7 μm.

(d) Production of Electrode Composite Material Layer (d-1) Production of Positive Electrode Composite Material Layer (Positive Electrode Layer)

The positive-electrode active material precursor powder, the solid electrolyte powder A prepared in (a-1), and acetylene black were weighed to reach, in terms of % by mass, 72%, 25%, and 3%, respectively, (where the volume ratio between the positive-electrode active material precursor powder and the solid electrolyte powder A was 76:24), and these powders were mixed for two hours using an agate-made mortar and an agate-made pestle. An amount of 20 parts by mass of N-methylpyrrolidinone (containing 10% by mass polypropylene carbonate) was added to 100 parts by mass of the obtained mixed powder and the mixture was stirred well with a planetary centrifugal mixer to form a slurry. All the above operations were conducted in an environment of the dew point minus 40° C. or below.

The obtained slurry was applied, with an area of 1 $cm^2$ and a thickness of 100 μm, to one surface of the solid electrolyte layer A produced in (b-1), and then dried at 70° C. for three hours. Next, the slurry was fired at 575° C. for 30 minutes in an atmosphere of nitrogen gas. Thus, a positive electrode composite material layer was formed on the one surface of the solid electrolyte layer A. As a result of observation of each of the obtained positive electrode composite material layers with a transmission electron microscope (TEM), no lattice image corresponding to crystal structures was found in some regions of the layer and the presence of an amorphous phase was therefore confirmed.

Note that in Example 2 and Comparative Example 2 the positive electrode composite material layers were produced in the same manner as above except that the solid electrolyte powder B prepared in (a-2) was used in place of the solid electrolyte powder A. Furthermore, in Example 3 and Comparative Example 3, the positive electrode composite material layers were produced in the same manner as above except that the solid electrolyte layer B prepared in (b-2) was used in place of the solid electrolyte layer A.

(d-2) Production of Negative Electrode Composite Material Layer (Negative Electrode Layer)

The negative-electrode active material precursor powder, the solid electrolyte powder prepared in (a-1), and acetylene black were weighed to reach, in terms of % by mass, 72%, 25%, and 3%, respectively, (where the volume ratio between the negative-electrode active material precursor powder and the solid electrolyte powder was 76:24), and these powders were mixed for two hours using an agate-made mortar and an agate-made pestle. An amount of 20 parts by mass of N-methylpyrrolidinone (containing 10% by mass polypropylene carbonate) was added to 100 parts by mass of the obtained mixed powder and the mixture was stirred well with a planetary centrifugal mixer to form a slurry. All the above operations were conducted in an environment of the dew point minus 40° C. or below.

The obtained slurry was applied, with an area of 1 $cm^2$ and a thickness of 100 μm, to one surface of the solid electrolyte layer A produced in (b-1), and then dried at 70° C. for three hours. Next, the slurry was fired at 650° C. for an hour in a nitrogen atmosphere. Thus, a negative electrode composite material layer was formed on the one surface of the solid electrolyte layer A. As a result of observation of each of the obtained negative electrode composite material layers with a transmission electron microscope (TEM), no lattice image corresponding to crystal structures was found in some regions of the layer and the presence of an amorphous phase was therefore confirmed.

Note that in Example 13 and Comparative Example 12 the negative electrode composite material layers were produced in the same manner as above except that the solid electrolyte powder B prepared in (a-2) was used in place of the solid electrolyte powder A. Furthermore, in Example 14 and Comparative Example 13, the negative electrode composite material layers were produced in the same manner as above except that the solid electrolyte layer B prepared in (b-2) was used in place of the solid electrolyte layer A.

Examples 1 to 11 and Comparative Examples 1 to 10

(e-1) Production of all-Solid-State Cell

For each of the laminates obtained in (d-1) and formed of a solid electrolyte layer and a positive electrode layer, a first current collector layer made of a metal and having a thickness as described in Tables 1 and 2 below was formed on the surface of the positive electrode layer opposite to the solid electrolyte layer using a sputtering system ("SC-701AT" manufactured by Sanyu Electron Co., Ltd.). Thereafter, metallic sodium serving as a counter electrode was pressure-bonded to the surface of the solid electrolyte layer opposite to the positive electrode layer, in an argon atmosphere of the dew point minus 60° C. or below, and the obtained product was placed on a lower lid of a coin cell and covered with an upper lid to produce a CR2032-type test cell.

Examples 12 to 22 and Comparative Examples 11 to 20

(e-2) Production of all-Solid-State Cell

For each of the laminates obtained in (d-2) and formed of a solid electrolyte layer and a negative electrode layer, a second current collector layer made of a metal and having a thickness as described in Tables 3 and 4 below was formed on the surface of the negative electrode layer opposite to the solid electrolyte layer using a sputtering system ("SC-701AT" manufactured by Sanyu Electron Co., Ltd.). Thereafter, metallic sodium serving as a counter electrode was pressure-bonded to the surface of the solid electrolyte layer opposite to the negative electrode layer, in an argon atmosphere of the dew point minus 60° C. or below, and the obtained product was placed on a lower lid of a coin cell and covered with an upper lid to produce a CR2032-type test cell.

(f) Charge and Discharge Test

The CR2032-type test cells obtained in Examples 1 to 22 and Comparative Examples 1 to 20 were used to undergo a charge and discharge test at 60° C. and measured in terms of weight energy density and volume energy density. In the charge and discharge test, as for the cells obtained in Examples 1 to 11 and Comparative Examples 1 to 10, charging (release of sodium ions from the positive-electrode active material) was implemented by CC (constant-current) charging from the open circuit voltage (OCV) to 5.2 V and discharging (absorption of sodium ions to the positive-electrode active material) was implemented by CC discharging from 5.2 V to 2 V.

On the other hand, as for the cells obtained in Examples 12 to 22 and Comparative Examples 11 to 20, charging (absorption of sodium ions to the negative-electrode active material) was implemented by CC charging from the open circuit voltage (OCV) to 0.1 V and discharging (release of sodium ions from the negative-electrode active material) was implemented by CC discharging from 0.1V to 2 V. The C rate was 0.01 C. The discharge capacity was defined as the quantity of electricity discharged per unit mass of electrode active material (positive-electrode active material or negative-electrode active material) contained in the electrode composite material layer (positive electrode layer or negative electrode layer). The results are shown in Tables 1 to 4 below.

(g) Peeling Test

After the current collector layers (first current collector layers or second current collector layers) were formed in (e-1) and (e-2), four cuts were made in each current collector layer at 2 mm intervals from an end thereof with a cutter knife to pass through the current collector layer, a piece of Scotch tape ("#610" manufactured by 3M) was applied to the current collector layer across the four cuts, and then the operation of pulling away the Scotch tape was repeated five times. The current collector layers were evaluated in such a manner that "cross" indicates those peeled from the electrode composite material layers (positive electrode layers or negative electrode layers) and "circle" indicates those not peeled from the electrode composite material layers. The results are shown in Tables 1 to 4 below.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Metal of First Current Collector Layer | | | | | | Al | | | Ti | Ag | Cu | SUS |
| Composition of Positive- | $Na_2O$ | | | | | | 27 | | | | | |
| Electrode Active Material | NiO | | | | | | 40 | | | | | |
| Precursor Powder [mol %] | $P_2O_5$ | | | | | | 33 | | | | | |
| Solid Electrolyte Powder | | A | B | | | | | | A | | | |
| Solid Electrolyte Layer | | | A | B | | | | | A | | | |
| Thickness of First Current Collector Layer (μm) | | 0.1 | 0.1 | 0.1 | 0.5 | 1 | 3 | 5 | 0.5 | 0.5 | 0.5 | 0.5 |
| Volume Energy Density ($mWh/cm^3$) | | 80.4 | 80.2 | 80.3 | 79.8 | 79.1 | 76.4 | 73.8 | 79.8 | 79.8 | 79.8 | 79.8 |
| Weight Energy Density (mWh/g) | | 31.1 | 31 | 31.1 | 30.9 | 30.6 | 29.5 | 28.5 | 30.7 | 30.1 | 30.2 | 30.4 |
| Peeling Test | | ○ | ○ | ○ | ○ | ○ | ○ | ○ | ○ | ○ | ○ | ○ |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Metal of First Current Collector Layer | | | | | | Au | | | | Al | |
| Composition of Positive- | $Na_2O$ | | | | | | 27 | | | | |
| Electrode Active Material | NiO | | | | | | 40 | | | | |
| Precursor Powder [mol %] | $P_2O_5$ | | | | | | 33 | | | | |
| Solid Electrolyte Powder | | A | B | | | | | | A | | |
| Solid Electrolyte Layer | | | A | B | | | | | A | | |
| Thickness of First Current Collector Layer (μm) | | 0.1 | 0.1 | 0.1 | 0.5 | 1 | 3 | 5 | 15 | 30 | 0.005 |
| Volume Energy Density ($mWh/cm^3$) | | 61 | 59 | 61 | 60.6 | 60.0 | 58.0 | 56.0 | 63.3 | 52.1 | 17.9 |
| Weight Energy Density (mWh/g) | | 23.3 | 23.2 | 23.3 | 22.2 | 20.8 | 16.8 | 14.1 | 24.3 | 19.9 | 6.9 |
| Peeling Test | | x | x | x | x | x | x | x | ○ | ○ | ○ |

TABLE 3

|  |  | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Metal of Second Current Collector Layer | | | | | | Al | | | Ti | Ag | Cu | SUS |
| Composition of Negative- | $Na_2O$ | | | | | | 20 | | | | | |
| Electrode Active Material | $TiO_2$ | | | | | | 40 | | | | | |
| Precursor Powder [mol %] | $SiO_2$ | | | | | | 40 | | | | | |
| Solid Electrolyte Powder | | A | B | | | | | | A | | | |
| Solid Electrolyte Layer | | | A | B | | | | | A | | | |
| Thickness of Second Current Collector Layer (μm) | | 0.1 | 0.1 | 0.1 | 0.5 | 1 | 3 | 5 | 0.5 | 0.5 | 0.5 | 0.5 |
| Volume Energy Density ($mWh/cm^3$) | | 24.4 | 24.4 | 24.3 | 24.3 | 24.1 | 23.2 | 22.4 | 24.3 | 24.3 | 24.3 | 24.3 |
| Weight Energy Density (mWh/g) | | 9.2 | 9.2 | 9.2 | 9.2 | 9.1 | 8.8 | 8.5 | 9.1 | 8.9 | 9 | 9 |
| Peeling Test | | ○ | ○ | ○ | ○ | ○ | ○ | ○ | ○ | ○ | ○ | ○ |

TABLE 4

| | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|
| Metal of Second Current Collector Layer | | | | Au | | | | | Al | |
| Composition of Negative-Electrode Active Material Precursor Powder [mol %] $Na_2O$ | | | | | 20 | | | | | |
| $TiO_2$ | | | | | 40 | | | | | |
| $SiO_2$ | | | | | 40 | | | | | |
| Solid Electrolyte Powder | A | B | | | | A | | | | |
| Solid Electrolyte Layer | | A | B | | | | A | | | |
| Thickness of Second Current Collector Layer (μm) | 0.1 | 0.1 | 0.1 | 0.5 | 1 | 3 | 5 | 15 | 30 | 0.005 |
| Volume Energy Density (mWh/cm$^3$) | 18.4 | 18.3 | 18.4 | 18.3 | 18.2 | 17.5 | 16.9 | 19.2 | 15.8 | 6.4 |
| Weight Energy Density (mWh/g) | 6.9 | 6.8 | 6.9 | 6.5 | 6.2 | 5.0 | 4.2 | 7.2 | 5.9 | 2.4 |
| Peeling Test | x | x | x | x | x | x | x | ○ | ○ | ○ |

As shown in Tables 1 and 2, in the cases where the first current collector layer made of Al, Ti, Ag, Cu or SUS was formed on the positive electrode layer, no peeling occurred with any thickness under the peeling test. Furthermore, in these cases, excellent volume energy densities and weight energy densities were exhibited. Particularly, in the cases where the first current collector layer was made of Al, excellent weight energy densities were exhibited as compared to the cases where the first current collector layer was made of the other metals. Unlike the above, in Comparative Examples 1 to 7 where the first current collector layer was made of Au, peeling occurred under the peeling test. Furthermore, since in Comparative Examples 8 and 9 the thicknesses of the first current collector layers were as large as 15 μm and μm, respectively, the volume energy densities decreased. Since in Comparative Example 10 the thickness of the first current collector layer was as small as 0.005 μm, the electrical conductivity decreased and the internal resistance of the cell increased, so that the discharge capacity decreased, resulting in decreases in both the weight energy density and the volume energy density. As shown in Tables 3 and 4, also in the cases where the second current collector layers were formed on the respective negative electrode layers, the same results were obtained.

FIG. 2 is a graph showing the relationship between the thickness of the current collector layer (first current collector layer) formed on each of the positive electrode layers produced in Examples 1 and 4 to 7 and Comparative Examples 1 and 4 to 9 and the weight energy density. As shown in FIG. 2, it was confirmed that when Al was used for the first current collector layer, the weight energy density was increased as compared to Au regardless of the thickness of the first current collector layer. This tendency was the same as for the current collector layers (second current collector layers) formed on the negative electrode layers.

REFERENCE SIGNS LIST

1 . . . all-solid-state sodium ion secondary battery
2 . . . solid electrolyte layer
2a, 2b . . . first, second principal surface
3 . . . positive electrode layer
4 . . . negative electrode layer
5, 6 . . . first, second current collector layer

The invention claimed is:

1. An all-solid-state sodium ion secondary battery comprising:
   a solid electrolyte layer having a first principal surface and a second principal surface opposite each other and made of a sodium ion-conductive oxide;
   a positive electrode layer formed on the first principal surface of the solid electrolyte layer;
   a negative electrode layer formed on the second principal surface of the solid electrolyte layer; and
   a current collector layer formed on a principal surface of at least one of the positive electrode layer and the negative electrode layer,
   wherein the current collector layer is made of at least one metallic material selected from the group consisting of aluminum, titanium, silver, copper, stainless steel, and alloys thereof, and
   the current collector layer has a thickness of not less than 10 nm and not more than 0.5 μm.

2. The all-solid-state sodium ion secondary battery according to claim 1, wherein the current collector layer is formed on each of the principal surfaces of both the positive electrode layer and the negative electrode layer.

3. The all-solid-state sodium ion secondary battery according to claim 1, wherein the current collector layer is made of aluminum or an alloy containing aluminum.

4. The all-solid-state sodium ion secondary battery according to claim 1, wherein the solid electrolyte layer contains at least one sodium ion-conductive oxide selected from β-alumina, β"-alumina, and NASICON crystals.

* * * * *